UNITED STATES PATENT OFFICE.

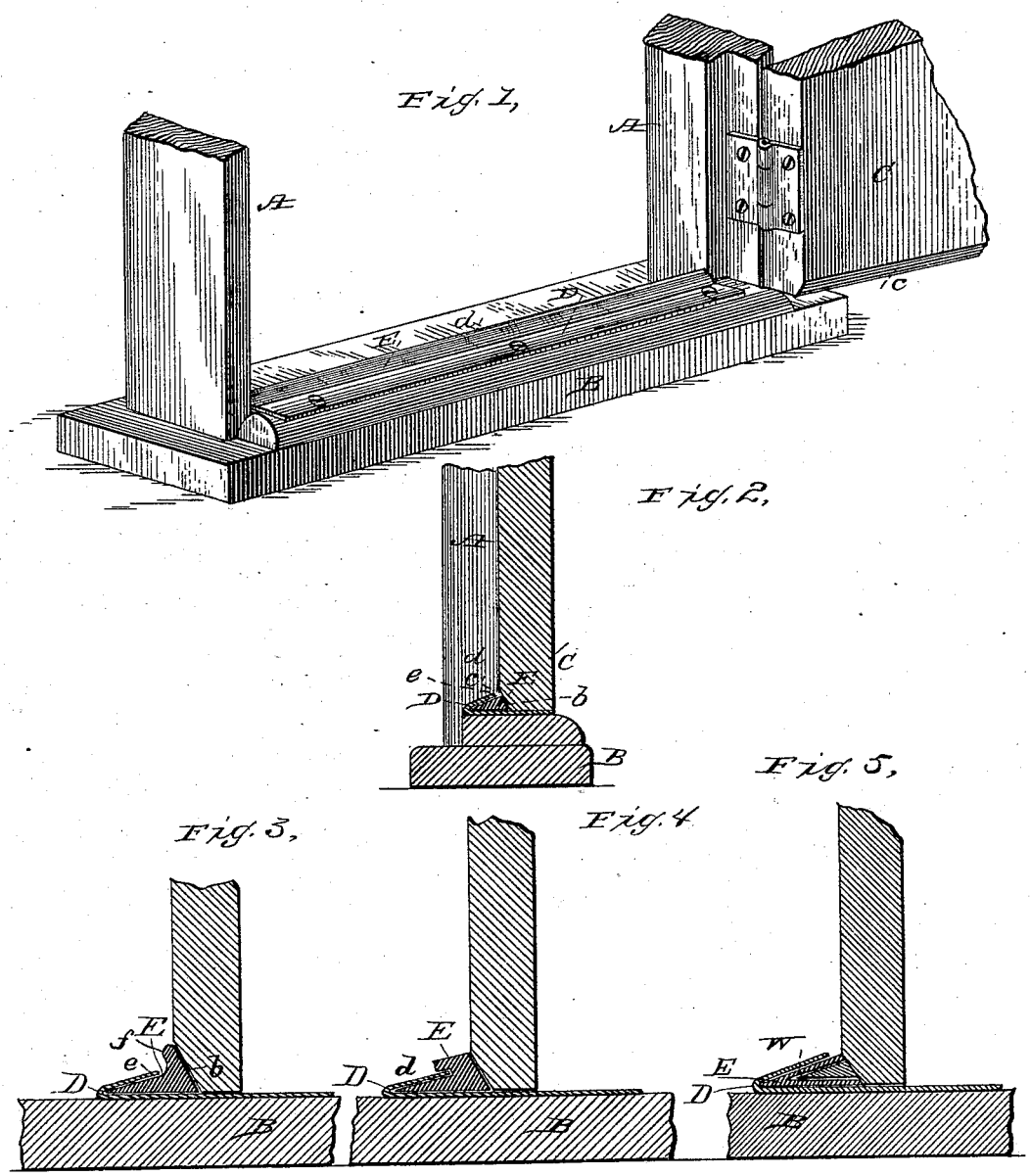

THOMAS H. PRUNER, OF SIOUX FALLS, DAKOTA TERRITORY.

WEATHER-STRIP.

SPECIFICATION forming part of Letters Patent No. 279,501, dated June 12, 1883.

Application filed September 20, 1882. (No model.)

*To all whom it may concern:*

Be it known that I, THOMAS H. PRUNER, of Sioux Falls, in the county of Minnehaha and Dakota Territory, have invented certain new and useful Improvements in Weather-Strips; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the lower part of a door-frame and door. Fig. 2 is a cross-section of the door and threshold provided with my improved weather-strip; and Figs. 3, 4, and 5 are cross-sections, showing various modifications in the construction and arrangement of my device.

Similar letters of reference indicate corresponding parts in all the figures.

My invention has relation to weather-strips for doors, having for its object to construct an inexpensive and efficient strip which will effectually exclude cold air and moisture.

To this end it consists in the detailed construction of a strip of that class, as hereinafter more fully described, and particularly pointed out in the claims.

In the accompanying drawings, the letter A designates the jambs of a door. B is the threshold, and G the door, which has a beveled edge, c. Upon the threshold is secured by screws, nails, or other suitable means a metallic plate, D, the outer edge of which is set up at an angle to form a lip, d, leaving a triangular space between said lip and the body or bottom of the plate. Into this space is inserted a rubber strip, (shown at E,) which projects beyond the lip d, as shown at e, and has its broad projecting outer edge cut off obliquely or slantingly, as shown at b, to fit the beveled edge c on the under side of the door. When the latter is closed its beveled under side c will bear against and compress the beveled edge b of the rubber strip, thus forming an air and water tight joint. If desired, the rubber strip E may be made with a lip, as shown at f in Fig. 3; or this lip may be made to overlap lip d of the metal plate, as shown in Fig. 4. This construction will be found desirable with large and heavy doors having deep thresholds; but it is not necessary under ordinary circumstances. Again, in Fig. 5, I have shown the rubber strip E consisting of a flat strip doubled around the sharp edge of a wedge, W, made of wood, metal, or other suitable material, and inserted, with the rubber around it, into the triangular space underneath the lip d, the broad end of the wedge projecting slightly beyond the rubber. As the door is closed and its beveled edge c strikes the projecting end of the wedge, the latter is forced into the cavity in the rubber, so as to expand it and cause it to press firmly against the bevel of the door, thus forming two air and water tight joints, one on each side of the wedge.

Having thus described my invention, I claim and desire to secure by Letters Patent of the United States—

1. As an article of manufacture, the compound weather-strip composed of a metallic plate, D, upset on one edge to form a lip, d, and a rubber strip, E, inserted into the triangular space between lip d and plate D, and cut off obliquely along its projecting outer edge, substantially as and for the purpose herein shown and specified.

2. The combination, with the threshold B and door C, having a beveled lower edge, c, of the weather-strip consisting of the metal plate D, upset along its outer edge to form the lip d, and rubber strip E, clamped in place between lip d and the body of the plate, and cut off obliquely to form a projecting beveled edge, b, substantially as and for the purpose herein shown and set forth.

In testimony that I claim the foregoing as my own I have hereunto affixed my signature in presence of two witnesses.

THOMAS HAMILTON PRUNER.

Witnesses:
ERIC O. MOLTAIRE,
WILLIAM SMITH BUTLER.